CONSTANT MASS LIQUID DISPENSING CONTROL

Original Filed Dec. 21, 1954 2 Sheets-Sheet 1

Inventor
Woolford L. Edmonston
By Walter S. Paul
Attorney

CONSTANT MASS LIQUID DISPENSING CONTROL

Original Filed Dec. 21, 1954 2 Sheets-Sheet 2

Inventor
Woolford L. Edmonston
By Walter S. Pawl
Attorney

United States Patent Office

Re. 24,595

Reissued Jan. 27, 1959

24,595

CONSTANT MASS LIQUID DISPENSING CONTROL

Woolford L. Edmonston, Laurel, Md., assignor to William E. McBride, Woodstown, N. J.

Original No. 2,810,367, dated October 22, 1957, Serial No. 476,825, December 21, 1954. Application for reissue May 22, 1958, Serial No. 737,177

5 Claims. (Cl. 119—81)

Matter enclosed in heavy brackets [ ] appears in the original patent but forms no part of this reissue specification; matter printed in italics indicates the additions made by reissue.

This invention relates in its broadest sense to liquid supply control means for dispensing a constant mass of the liquid whether it be into a container like a watering pan or dish for animals, where it flows in bulk for drinking purposes or into a sponge material like an air conditioning humidifier unit where it soaks into capillary spaces for evaporation, or into measuring containers of any kind for measuring off exact successive mass batches of the liquid or for maintaining one batch continuously constant by replenishing any losses therefrom as they occur.

The invention is illustrated as applied only to watering pans for small animals, such as fowl, although it could be applied to many other uses as indicated above, by simply replacing the pan by any other type of closed or open bulk container or sponge material.

The object generally is to provide means for dispensing a liquid from a pressure supply pipe having an upwardly opening supply nozzle normally closed by a check valve, to a container requiring a predetermined mass of liquid to be maintained in it by supplying a controlled amount of the liquid to replace continuously whatever liquid is used up, as by drinking, evaporation or other withdrawal therefrom, thus maintaining a constant capacity in said container, said means forming a part of the container itself.

Another object is to make this container readily removable for cleaning purposes, by a simple lifting operation, and replaceable after cleaning by simply lowering it over the check valve in the supply nozzle, whereby the check valve is automatically opened for the continuous supply of liquid into the container whenever the mass of liquid is reduced below a predetermined amount, the nozzle being automatically closed whenever this amount is attained in the container, and opened when it is reduced below this amount.

A further object is to provide a watering pan for animals and the like, mountable over water spout connected to a source of water supply, said pan and water spout being provided with control means for automatically maintaining a constant supply of water in said pan up to a definite level therein by opening and closing the spout in accordance with the demand of the animals drinking therefrom.

Figure 1:
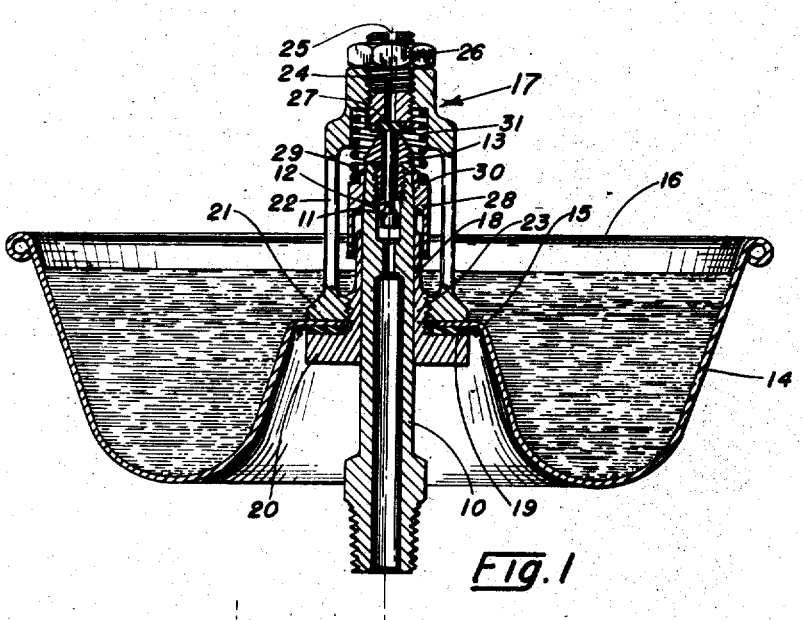
Figure 2:
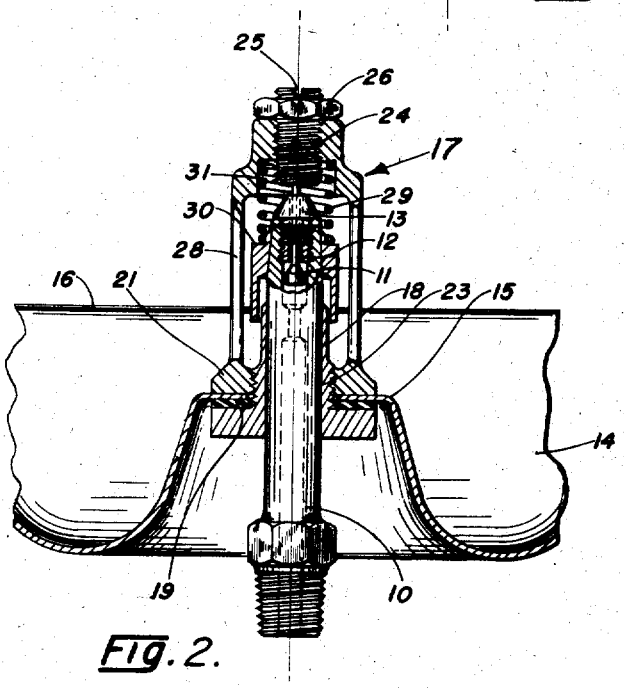
Figure 3:
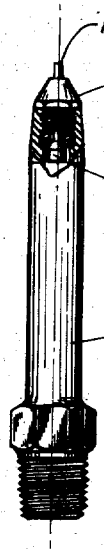
Figure 4:
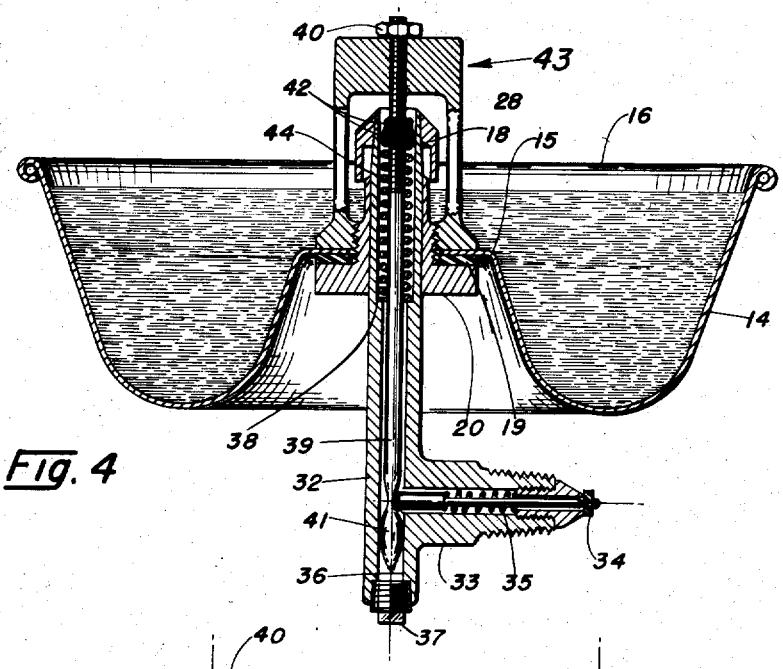
Figure 5:
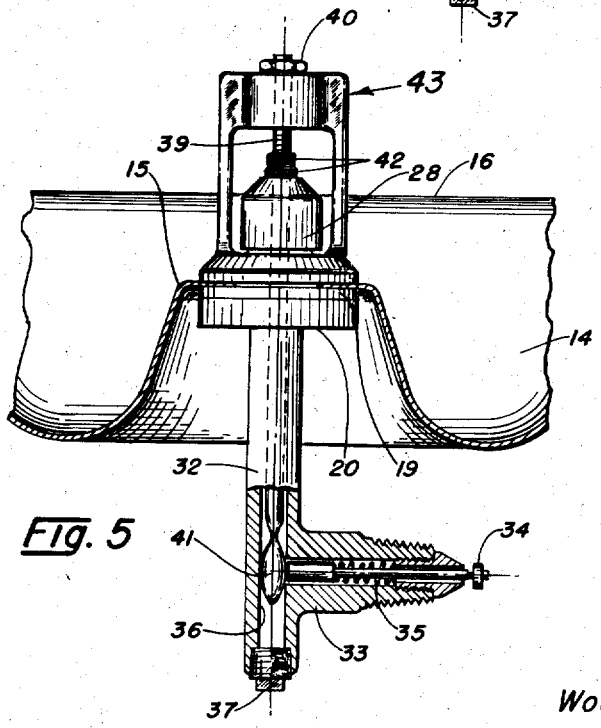
Figure 6:
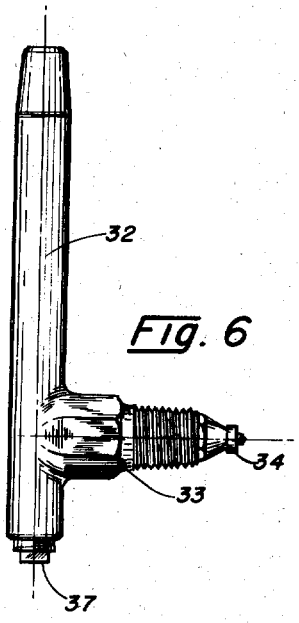

Further and more specific objects will appear in the following detailed description of this invention, when taken together with the accompanying drawings, wherein, Fig. 1 is axial vertical section of one form of the invention as applied to a watering pan, Fig. 2 is a partial view of a similar section showing the position of the valve parts when the pan is empty, Fig. 3 is a view of the water supply nozzle or spout showing the check valve in section, Fig. 4 is an axial vertical section of another form of the invention wherein the check valve is located internally of the spout to protect it from damage when the pan is removed, Fig. 5 is a partial sectional view showing the check valve in open position with the pan empty, and Fig. 6 is a view of the nozzle showing the check valve in normally closed position.

While only two forms of the invention are shown for purposes of illustration any number of other adaptations may be made as suggested above, to suit specific requirements of either measuring out or maintaining a constant mass of liquid in bulk or dispersed in a spongy or absorbent material. The same spout and supply control attachment may be used with any type of container.

Referring to the form illustrated in Figs. 1 to 3, the standpipe or spout 10 may be installed in an outlet fitting in a pipe line water supply system at a strategic location where it may be desired to continuously provide drinking water for farm, domestic or wild animals, or fresh water for a bird bath or fish basin, or water plant bowl, etc. Spout 10 is equipped with a normally closed check valve 11 with a protruding stem 12 in a nipple 13 screwed into the upper end of the spout. The valve shown is of the internal pressure closing type, although a light spring could be used to assist it in normally closing off the supply of water through the nipple.

A suitable bowl 14 may have the center portion of its bottom 15 pushed up part way towards the level of its top edge 16. This center portion has an opening in which is mounted a fitting 17 by which the bowl is hung over the spout. This fitting comprises a flanged sleeve 18 that fits freely around the spout 10 and extends in height to about the level of the top edge 16 of the bowl. A sealing washer 19 may be used between the flange 20 of the sleeve and the bottom of the bowl, and is clamped to form a water-tight joint by the internally threaded base 21 of the yoke 22 screwed over the externally threaded base 23 of the sleeve 18. The bridge of the yoke is centrally tapped to receive an adjustable screw 24 having a screwdriver slot 25 in its upper end and provided with a lock nut 26 for setting it in adjusted position in the yoke. At its lower end the screw 24 is provided with a valve seat 27 for closing off the nipple opening when the bowl is sufficiently loaded with water to bring the seat down to the nipple.

The upper end of spout 10 is slightly tapered to receive the tapered collar 28 which is biased over this end of the spout by cooled spring 29 compressed between a shoulder 30 on collar 28 and the top of countersunk bore 31 in the bottom of the yoke bridge. Collar 28 has a sleeve apron fitting loosely around the upper portion of sleeve 18 and acts as a shield to prevent the water flowing out of the nipple into the bowl from leaking down between sleeve 18 and spout 100. Spring 29 is of a selected strength to permit seat 27 to depress stem 12 to start the flow of water through the nipple when the empty bowl is hung over the spout, and to lower the seat 27 to the nipple and close off the water flow when the bowl is properly filled. The extent of filling may be adjusted to the precise amount desired by adjustment of the screw 24 to permit the spring to support the required total weight before the nipple is closed.

Another form of the invention is illustrated in Figs. 4, 5 and 6, wherein the same principle is involved, but the form of the spout and location of the check valve and arrangement of parts are somewhat modified. As may be seen in these figures, the delicate check valve stem does not protrude as in the first form, when the bowl is lifted off the spout, and is therefore not subject to accidental damage as in the first form. Another advantage in this second form is that dirt cannot be caught in the check valve here when the bowl is removed to interfere with its proper closing, because the check valve is protected. The dirt, if any gets into the spout, will settle down in the bottom of the spout, where its accumulation will be easily flushed out whenever flow is started, or it may be emptied through the drain plug at the bottom.

On the other hand, the first form may be considered to have advantages which are absent in the second form, for some purposes, e. g. the adjustment for filling to the proper level may be more readily accomplished in the first form, during operation when the bowl is suspended in place, whereas in the second form the bowl has to be lifted off the spout during adjustment of the spring compression. Of course the desirability of these and other special features of either form will determine whether they will be considered advantages or disadvantages. For the purpose of simplicity and making a fool proof construction, it may be desired to eliminate adjustability for some purposes, and have the design determined for proper operation at the factory.

Referring to Figs. 4, 5 and 6, spout 32 has a T connection 33 for screwing to a horizontal fitting in a supply line. The check valve 34 is mounted in this connection and is normally biased to closed position by the light spring 35. The inner end of its stem normally protrudes into the vertical bore 36 of the spout. The lower end of this vertical bore is closed off by drain plug 37. The upper end of the spout is counterbored for a distance down to form an internal shoulder at 38. The same bowl 14 may be used with a modified yoke but having the same type of threaded base screwed over the same type of sleeve 18 to form a water tight seal between the sleeve flange 20 and the center portion of the bowl bottom 15 by clamping the washer 19 therebetween. The upper end of the spout in this case is also slightly tapered to receive the same type of collar 28 as in the first form. However, in this second form a long stem 39 is adjustably threaded at its upper end through the bridge of the yoke, and is provided with a lock nut 40. This stem extends downwardly into the spout and has a cam portion 41 at its lower end cooperating with the protruding end of the stem of check valve 34.

A coiled compression spring 44 is held in the counterbore of the spout between the shoulder 38 and a pair of lock nuts 42 adjustably threaded on the upper portion of stem 39. As the fitting 43 with the bowl is lowered over the spout 32, the lobe of the cam portion 41 of the stem engages the valve stem of valve 34 and starts the flow of water as shown in Fig. 5. As the bowl fills up, the additional weight compresses the spring 44 further until the groove portion of cam 41 comes opposite the check valve 34 and permits the valve stem to protrude into the vertical bore and allow the check valve to close and stop the flow. Any reduction in the amount of water in the bowl will automatically lift the cam 41 and resume the water flow until the water is replenished. Adjustment for changing the extent of filling of the bowl is accomplished by moving lock nuts 42 on stem 39. It may also be done by changing the extent to which the threaded end of stem 39 is threaded through the yoke bridge.

Obviously the upper end of stem 39 above the adjustment nuts 42 could be made separate, so that it could be lifted off with the pan assembly without removing the lower portion. This would make it easier to make adjustment of the lock nuts 42 on the lower portion, when required.

It should be further noted that in the form shown in Figs. 1 to 3, the stem 12 of check valve 11 will normally protrude a sufficient distance to be depressed when the pan assembly is hung over the spout even if the pan is empty so as to start the flow of water. Upon stopping of the flow, when the pan is filled so that the seat 27 closes off the nipple opening, the stem 12 may drop away from seat 27 and the valve head 11 may close off the restricted passage below it; but as soon as some water is removed from the pan, seat 27 will rise off the nipple and flow of water will resume and will lift the valve head 11 off the restriction. When the pan assembly is lifted off the spout for any purpose, obviously the hydraulic pressure in the supply will instantly cause a sufficient flow to lift the check valve to its normally closed position whereby the flow will be immediately cut off and remain that way until the pan assembly is replaced and the seat 27 again keeps the stem 12 depressed, the flow then being controlled by the seat 27 in cooperation with the opening in the top of the nipple 13. Should any dirt fall into the nipple opening while the pan assembly is removed, it will immediately be loosened by the movement of the stem 12 and flushed out by the initial flow established as soon as the pan assembly is remounted on the spout.

A flushing action of any dirt falling into the spout 32 in the form shown in Figs. 4 to 6, will likewise be flushed out in a similar manner by reason of the movement of the stem 39 therein.

Referring back to the taper fit between the upper end of the spout in either form of the device and the internally tapered collar or sleeve, it is such that it will prevent leakage of the water flowing over it down the outer surface of the spout, yet will not bind so that the pan assembly may be easily lifted off the spout.

Many other obvious modifications in form and arrangement of parts may be made in accordance with specific requirements without departing from the spirit and scope of this invention, as defined in the appended claims.

What is claimed is:

1. Liquid dispensing means comprising a standpipe adapted for connection to a pressure source of liquid, a check valve [having a closing spring] mounted therein and normally closing off flow therethrough when not in use, a liquid container having means for hanging it over said standpipe, said means including a connection for automatically opening said normally closed valve when said container is hung on said standpipe and directing the flow of liquid from said standpipe into said container, and means for closing off the flow whenever the liquid in the container reaches a predetermined amount.

2. Liquid dispensing means as defined in claim 1, wherein said check valve is in the upper end of said standpipe and has a protruding valve stem, said hanging means connection including a compressed spring designed to carry the weight of said container and cause the part of the connection over the standpipe to open said valve by depressing said protruding valve stem when the container is empty and to operate said closing means to close off the opening at the top of the standpipe whenever the container is filled to the predetermined degree and reopen it whenever some of the liquid in the container has been removed.

3. The combination defined in claim 2, said closing means being adjustable to close off the flow at different degrees of filling of said container.

4. The combination defined in claim 1, said standpipe having a T-connection to the source, said check valve being located in said T-connection and having its stem protruding into the vertical bore of said standpipe, said hanging means connection including a compressible spring designed to carry the weight of said container and cause a cam rod extending downwardly into said standpipe from a part of the connection over said standpipe to open said valve by depressing said protruding valve stem when the container is empty and to operate said closing means by lowering said cam rod to a point where it releases the protruding valve stem and closes the check valve whenever the liquid in the container reaches a predetermined amount.

5. The combination defined in claim 4, said closing means being adjustable to close off the flow at any desired degree of filling of said container.

References Cited in the file of this patent or the original patent

UNITED STATES PATENTS 1,160,511 Imschweiler ---------- Nov. 16, 1915

1,702,973 Lord ---------- Feb. 19, 1929
2,541,622 Toadvine ---------- Feb. 13, 1951
2,651,321 McBride ---------- Sept. 8, 1953
2,737,967 Johnson ---------- Mar. 13, 1956
2,752,935 Keyser ---------- July 3, 1956
2,790,417 Brembeck ---------- Apr. 30, 1957